United States Patent
Bagheri et al.

(10) Patent No.: US 11,924,130 B2
(45) Date of Patent: *Mar. 5, 2024

(54) DETERMINING REFERENCE SIGNAL LOCATIONS

(71) Applicant: Motorola Mobility LLC, Chicago, IL (US)

(72) Inventors: Hossein Bagheri, Urbana, IL (US); Ravikiran Nory, Buffalo Grove, IL (US); Vijay Nangia, Woodridge, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/510,157

(22) Filed: Oct. 25, 2021

(65) Prior Publication Data

US 2022/0045819 A1 Feb. 10, 2022

Related U.S. Application Data

(63) Continuation of application No. 16/881,378, filed on May 22, 2020, now Pat. No. 11,159,293, which is a continuation of application No. 16/141,877, filed on Sep. 25, 2018, now Pat. No. 10,700,832, which is a continuation of application No. 15/235,967, filed on Aug. 12, 2016, now Pat. No. 10,142,071.

(51) Int. Cl.
*H04L 5/00* (2006.01)
*H04L 5/14* (2006.01)
*H04W 72/0446* (2023.01)

(52) U.S. Cl.
CPC .......... *H04L 5/0048* (2013.01); *H04L 5/0044* (2013.01); *H04L 5/0078* (2013.01); *H04W 72/0446* (2013.01); *H04L 5/0007* (2013.01); *H04L 5/0058* (2013.01); *H04L 5/0094* (2013.01); *H04L 5/1469* (2013.01)

(58) Field of Classification Search
None
See application file for complete search history.

(56) References Cited

U.S. PATENT DOCUMENTS 10,142,071 B2    11/2018  Bagheri et al.
11,159,293 B2 *  10/2021  Bagheri ................ H04L 5/0078
(Continued)

FOREIGN PATENT DOCUMENTS

WO    2015/038057 A1    3/2015

OTHER PUBLICATIONS

Ericsson, "Physical Design Aspects of sPDSCH", 3GPP TSG-RAN WG1 #85, R1-165295, May 23-27, 2016, pp. 1-5.
(Continued)

*Primary Examiner* — Diane L Lo
(74) *Attorney, Agent, or Firm* — Kunzler Bean & Adamson

(57) ABSTRACT

For determining reference signal locations, a method determines a number of Transmission Time Intervals (TTI) in a scheduled transmission of a plurality of TTI. The method further determines one or more reference signal locations based on the number of TTI and one or more of a parameter received from a higher layer wherein the higher layer is higher than a physical layer, a subframe index, a subband size, and a Time Division Duplex (TDD) configuration for the scheduled transmission.

19 Claims, 19 Drawing Sheets

(56) References Cited

U.S. PATENT DOCUMENTS

| | | |
|---|---|---|
| 2008/0159250 A1 | 7/2008 | Kowalski |
| 2010/0008445 A1 | 1/2010 | Khan |
| 2015/0319757 A1 | 11/2015 | Baldemair et al. |
| 2016/0021658 A1 | 1/2016 | Chen et al. |
| 2018/0279388 A1 | 9/2018 | Miao et al. |
| 2019/0037554 A1* | 1/2019 | Gao .................... H04W 72/23 |
| 2019/0116583 A1 | 4/2019 | Sahlin et al. |

OTHER PUBLICATIONS

ZTE Microelectronics, "Study on PDSCH Transmission in Shortened TTI", 3GPP TSG RAN WG1 Meeting #85, R1-164642, May 23-27, 2016, pp. 1-7.

* cited by examiner

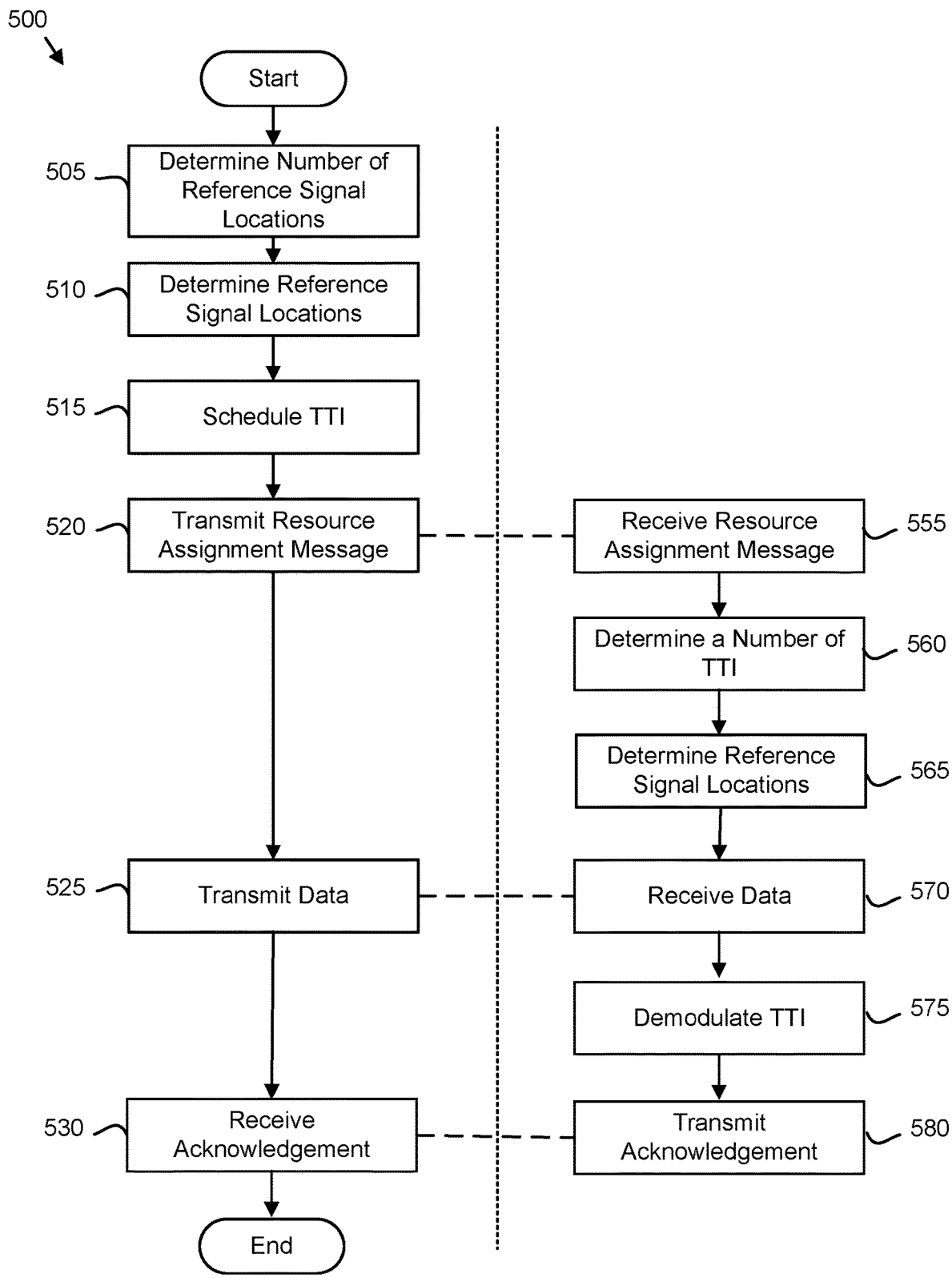

DETERMINING REFERENCE SIGNAL LOCATIONS

CROSS-REFERENCE TO RELATED APPLICATIONS

This is a continuation application of and claims priority to U.S. patent application Ser. No. 16/881,378, entitled "DETERMINING REFERENCE SIGNAL LOCATIONS" and filed on May 22, 2020 for Hossein Bagheri, which is incorporated herein by reference, U.S. patent application Ser. No. 16/141,877, entitled "DETERMINING REFERENCE SIGNAL LOCATIONS" and filed on Sep. 25, 2018 for Hossein Bagheri, which is incorporated herein by reference, which claims priority to U.S. patent application Ser. No. 15/235,967 entitled "DETERMINING REFERENCE SIGNAL LOCATIONS" and filed on Aug. 12, 2016 for Hossein Bagheri, which is incorporated herein by reference.

BACKGROUND

Field

The subject matter disclosed herein relates to reference signal locations and more particularly relates to determining reference signal locations.

Description of the Related Art

In Long Term Evolution (LTE) and other wireless communication standards, communication latency may be reduced by employing shorter minimum Transmission Time Intervals (TTI).

BRIEF SUMMARY

A method for determining reference signal locations is disclosed. The method determines a number of Transmission Time Intervals (TTI) in a scheduled transmission of a plurality of TTI. The method further determines one or more reference signal locations based on the number of TTI. An apparatus also performs the functions of the method.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 5A is a schematic flow chart diagram illustrating one embodiment of a reference signal location determination method;

DETAILED DESCRIPTION

Figure 1:
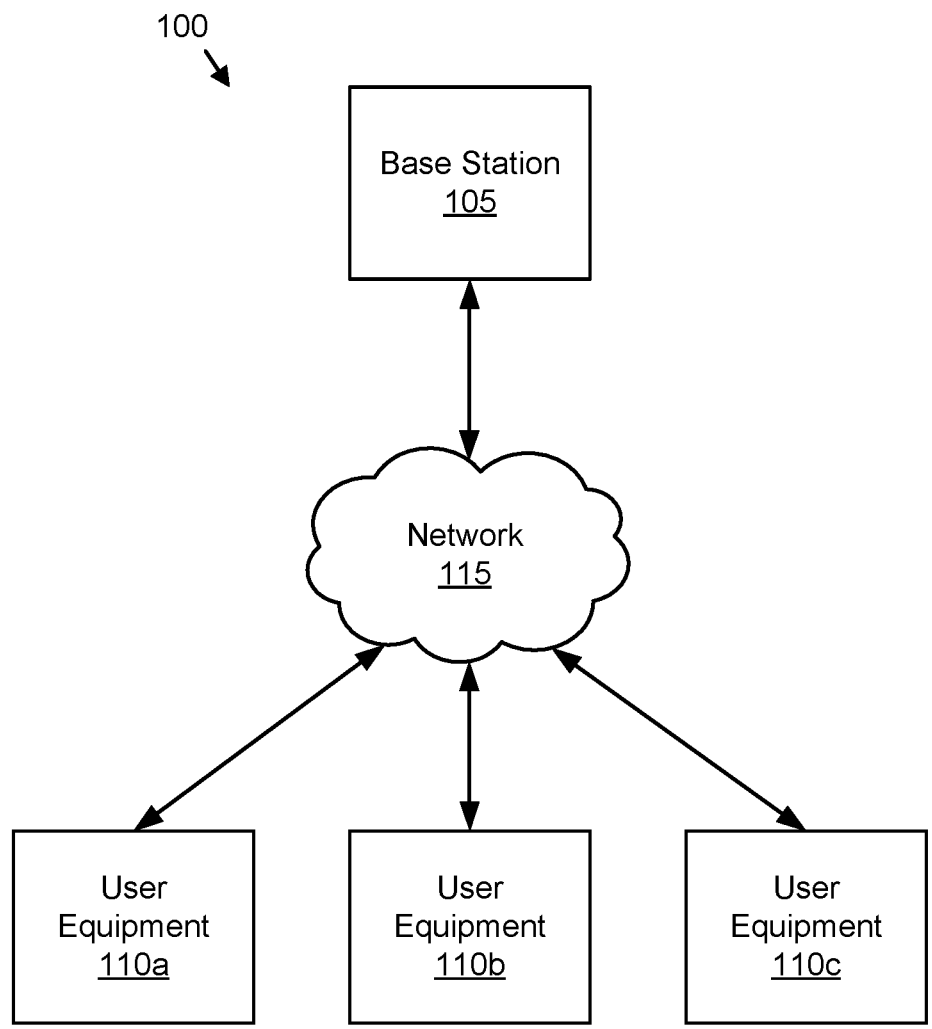
FIG. 1 is a schematic block diagram illustrating one embodiment of a communication system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic block diagram illustrating one embodiment of a communication system 100. The system 100 includes a base station 105, a network 115, and user equipment 110a-c. The base station 105 may communicate with the user equipment 110a-c through the network 115. The base station 105 may be an evolved node B (eNB) Long Term Evolution (LTE) base station. The user equipment 110 may be a mobile telephone, a machine-type communications (MTC) device, a tablet computer, a laptop computer, and embedded communication devices in automobiles, kiosks, appliances, and the like. The network 115 may be a mobile telephone network. Alternatively, the network 115 may be a wide-area network, a wireless network, or combinations thereof.

The base station 105 may communicate data to the user equipment 110 via a scheduled transmission. The scheduled transmission may include a plurality of Transmission Time Intervals (TTI). In one embodiment, the TTI are shortened TTI (sTTI), although for simplicity all TTI are referred to as TTI regardless of length. The TTI maybe organized in a subframe, with each subframe or Physical Resource Block (PRB) comprising a plurality of symbols as will be described hereafter.

A Physical Downlink Control Channel (PDCCH) may carry Downlink Control Information (DCI) such as information regarding a reference signal. The reference signal may encode information about the data being transferred in the scheduled transmission as well as information about the resources that the user equipment 110a-c should use for transmitting uplink data.

The latency of the network 115 may be decreased by shortening the TTI in a subframe. Unfortunately, as the TTI are shortened, the overhead due to the reference signals increases. The embodiments described herein reduce the overhead of the reference signals by sending the reference signals in a subset of the TTI as will be described hereafter. The embodiments may indirectly communicate the reference signal locations in the subset of TTI using a number of the TTI, as well as resource assignment messages, parameters received from a higher layer, a subframe index, a time interval between TTI, a subband size, and a Time Division Duplex (TDD) configuration to communicate the reference signal locations. The reference signals may then be communicated in the reduced set of reference signal locations. As result, the reference signal density is reduced, reducing the latency of data communication for the system 100.

Figure 2A:
FIG. 2A is a schematic block diagram illustrating one embodiment of a subframe.

FIG. 2A is a schematic block diagram illustrating one embodiment of a subframe 125. In one embodiment, the subframe 125 communicates data over a 1 millisecond (ms) time interval. Each subframe 125 may comprise a plurality of resource blocks 130, with each resource block 130 occupying a unique combination of modulation frequency and time interval within the subframe 125.

Figure 2B:
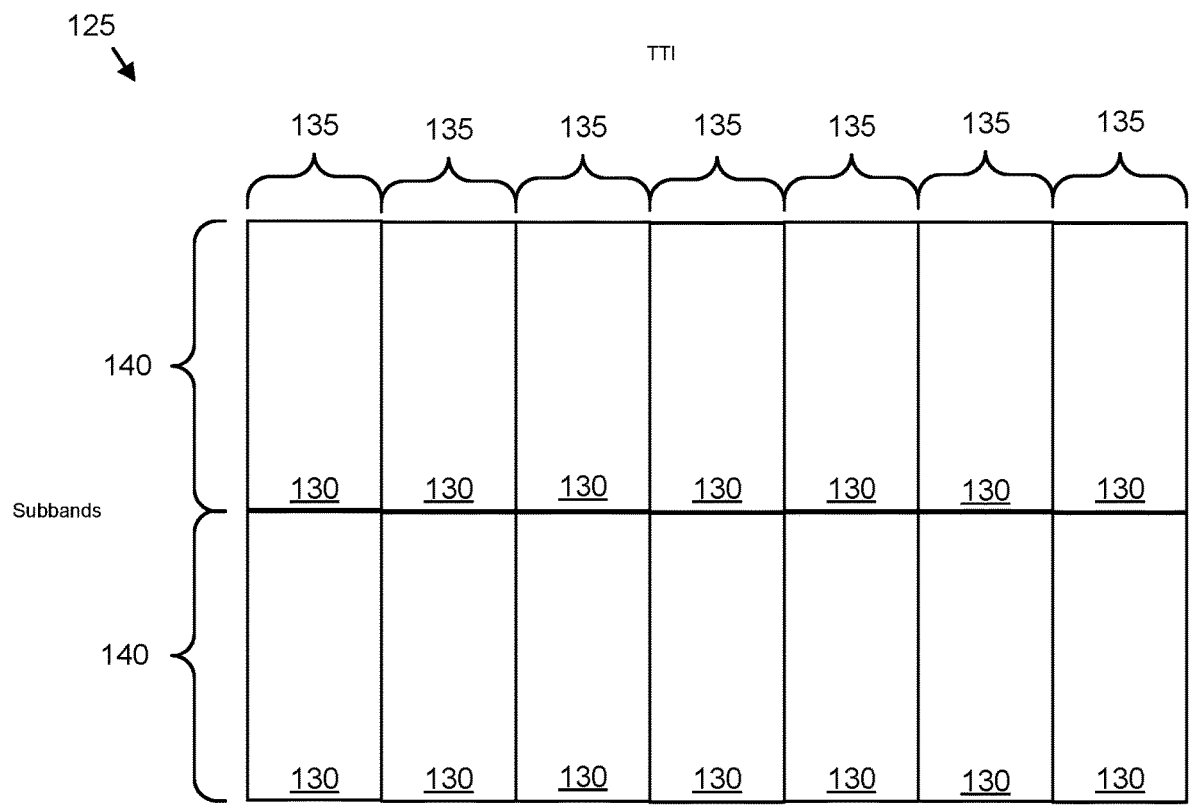
FIG. 2B is a schematic block diagram illustrating one alternate embodiment of a subframe.

FIG. 2B is a schematic block diagram illustrating one alternate embodiment of the subframe 125. For simplicity, the subframe 125 is depicted with seven TTI 135 of two Orthogonal Frequency-Division Multiplexing (OFDM) symbols each. Each combination of a TTI 135 and a subband 140 represents a resource block 130. A subframe 125 or other organization of data may include any number of resource blocks 130, TTI 135, and/or subbands 140.

For a particular TTI length (e.g., 2 symbol sTTI 135), the user equipment 110 may assume a resource block group (RBG) size in sTTI 135 containing Cell-Specific Reference Signals (CRS) Resource Elements (RE) (or any other signals/channels), would be a function such as a scaling factor of the RBG size in sTTI 135 not containing CRS REs (or any other signals/channels). For instance, if the RBG size in non-CRS sTTI 135 is 5 resource blocks 130, then the RBG size for CRS-sTTI 135 is 6 resource blocks 130.

The scaling factor of RBG size for sTTI 135 containing CRS (or other reference symbols, like positioning, Channel State Information Reference Signals (CSI-RS), etc. or other channels to sTTI 135 not containing such signals, can be configured by higher layers or by physical layer, e.g., the possible set of scaling factors could be {1, 1.2}. Instead of scaling factor, an offset can be used. For instance, an offset of "1" could mean the RBG size in the sTTI 135 including CRS (or other reference symbols, like positioning, CSI-RS, etc. or other channels) is one more RB larger than that of used for sTTI 135 without CRS (or other reference symbols, like positioning, CSI-RS, etc. or other channels). This offset may be applied when the RBG size is fixed and not signaled in the multi-TTI grant, and even if a single-TTI grant is applied. It could be configured by higher layer signaling such as Radio Resource Control (RRC) or may be fixed in the specifications.

In one embodiment, if an sTTI 135 with scaled or offset RBG size with respect to the RBG size of other scheduled sTTI 135 is present in the multi-TTI 135 scheduled set of sTTI 135 where only a subset of sTTI 135 contain reference signals 155, in terms of reference signal usage from other sTTI 135, the same precoder is assumed to be applied across all resource blocks 130 in RBG (irrespective to RBG size) in all sTTI 135 benefiting from the same reference signal 155 (DMRS) symbols. This approach can give flexibility to eNB to utilize resources in sTTI 135 without CRS for scheduling other user equipment 110.

Figure 2C:
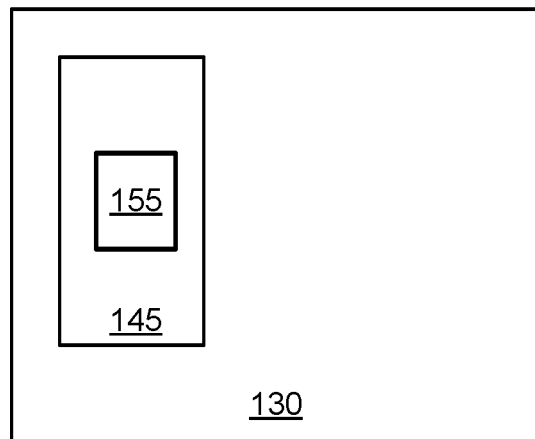
FIG. 2C is a schematic block diagram illustrating one embodiment of a resource block.

FIG. 2C is a schematic block diagram illustrating one embodiment of a resource block 130. In the depicted embodiment, the resource block 130 includes a reference signal location 145. A reference signal 155 may be transmitted in the reference signal location 145. The reference signal 155 may encode information such as DCI about the data being transmitted in the scheduled transmission as well as information about the resources that the user equipment 110 should use for transmitting uplink data. The presence or absence of a reference signal 155 may enable some unused resources including TTI 135 where the reference signal 155 is absent to be used for data transmission.

Figure 2D:
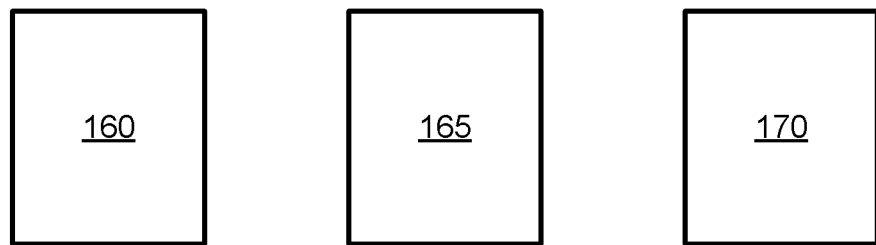
FIG. 2D is a schematic block diagram illustrating one embodiment of messages.

FIG. 2D is a schematic block diagram illustrating one embodiment of messages. A resource assignment message 160, a scheduled transmission 165, and an acknowledgment message 170 are shown. The resource assignment message 160 may include downlink assignment information and/or uplink grants and may be communicated to the user equipment 110 over the PDCCH. The scheduled transmission 165 may include one or more subframes 125. The acknowledgment message 170 may acknowledge that data in the scheduled transmission 165 was received.

For a particular TTI length (e.g., 2 symbol sTTI 135), the user equipment 110 may assume a resource block group (RBG) size in sTTI 135 containing CSR RE (or any other signals/channels), would be a function such as a scaling factor of the RBG size in sTTI 135 not containing CRS REs (or any other signals/channels). For instance, if the RBG size in non-CRS sTTI 135 is 5 resource blocks 130, then the RBG size for CRS-sTTI is 6 resource blocks 130.

The scaling factor of RBG size for sTTI 135 containing CRS (or other reference symbols, like positioning, CSI-RS, etc. or other channels) to sTTI 135 not containing such signals, may be configured by higher layers or by physical layer, e.g., the possible set of scaling factors could be {1, 1.2}. Instead of scaling factor, an offset can be used. For instance, an offset of "1" could mean the RBG size in the sTTI 135 including CRS (or other reference symbols, like positioning, CSI-RS, etc. or other channels) is one more resource blocks 130 larger than that of used for sTTI 135 without CRS (or other reference symbols, like positioning, CSI-RS, etc. or other channels). This offset may be applied when the RBG size is fixed and not signaled in the multi-TTI grant, and even if a single-TTI grant is applied. It could be configured by higher layer signaling such as Radio Resource Control (RRC) or fixed in the specifications.

In one embodiment, if an sTTI 135 with scaled or offset RBG size write RBG size of other scheduled sTTI 135 is present in the multi-TTI 135 scheduled set of sTTI 135 where only a subset of sTTI reference signals 155, in terms of reference signal usage from other sTTI 135, the same precoder is assumed to be applied across all resource blocks 130 in RBG (irrespective to RBG size) in all sTTI 135 benefiting from the same DMRS symbols. This approach can give flexibility to eNB to utilize resources in sTTI 135 without CRS for scheduling other user equipment 110.

FIG. 3A-H are a schematic block diagram illustrating embodiments of reference signal locations 145 at predetermined TTI instances 135 of the plurality of TTI 135 within a subframe 125. The predetermined TTI instances 135 are hereafter indicated by a crosshatch. The illustrated reference signal locations 145 are exemplary of reference signals being communicated within predetermined TTI instances 135 that are a subset of the plurality of TTI 135 within a subframe 125, and are not limiting. The reference signal locations 145 and the predetermined TTI instances 135 may be determined through a calculation, a table lookup, and/or one or more logical tests as will be described hereafter.

One or more reference signal locations 145 may be determined to be in predetermined TTI instances 135 of the plurality of TTI 135. A number of predetermined TTI instances 135 and/or a number of predetermined TTI instances 135 may be less than the number of TTI 135, wherein the reference signal 155 is present only in the predetermined TTI instances 135. In one embodiment, the one or more reference signal locations 145 are determined to be in predetermined subband instances 140 of predetermined TTI instances 135.

For simplicity, seven TTI 135 and one or two subbands 140 are shown. However, the embodiments may be practiced with reference signals 155 being communicated within other combinations of predetermined TTI instances 135 and predetermined subband instances 140.

Figure 3A:
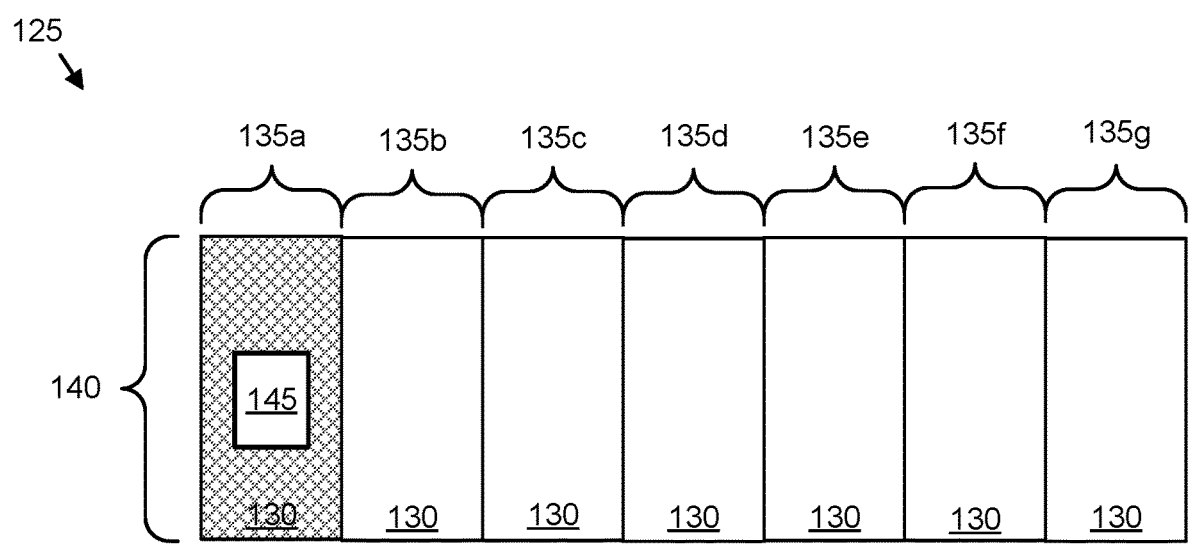
FIG. 3A-H are a schematic block diagram illustrating embodiments of reference signal locations within a subframe.

FIG. 3A shows one reference signal location 145 within a predetermined TTI instance 135 that is the first TTI 135*a* of a given subband 140 of a subframe 125. In alternate embodiments, the predetermined TTI instance 135 for the one reference signal location 145 may be any TTI 135*a-g* of the subframe 125.

Figure 3B:
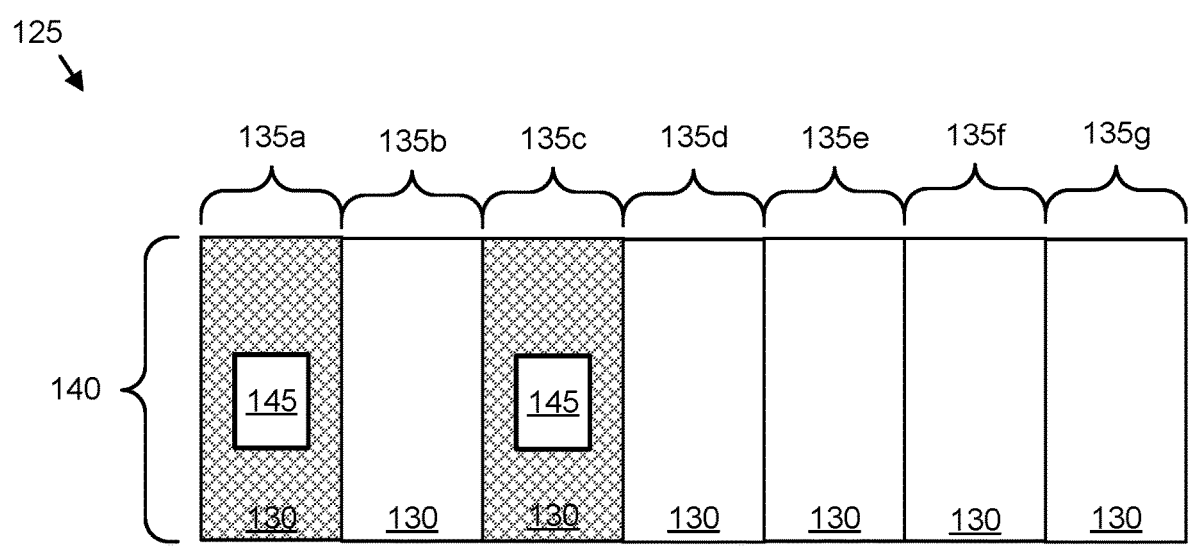

FIG. 3B shows two reference signal locations 145 at two predetermined TTI instances 135 within a given subband 140 of the subframe 125. Although the two predetermined TTI instances 135 are depicted as a first and third TTI 135*a/c*, the two predetermined TTI instances 135 may be any TTI 135*a-g* of the subframe 125.

Figure 3C:
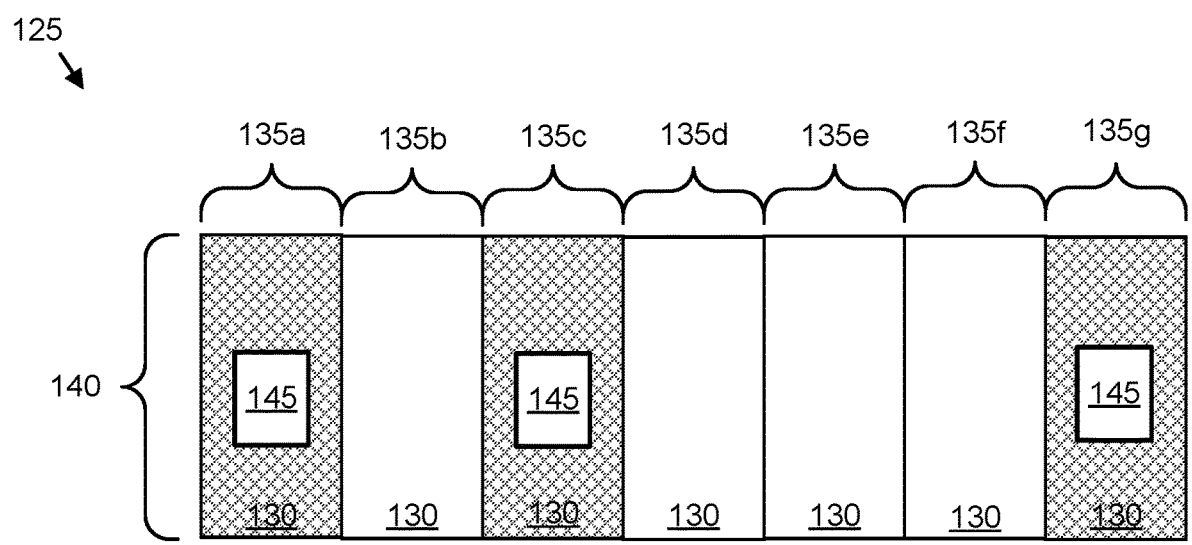
Figure 3D:
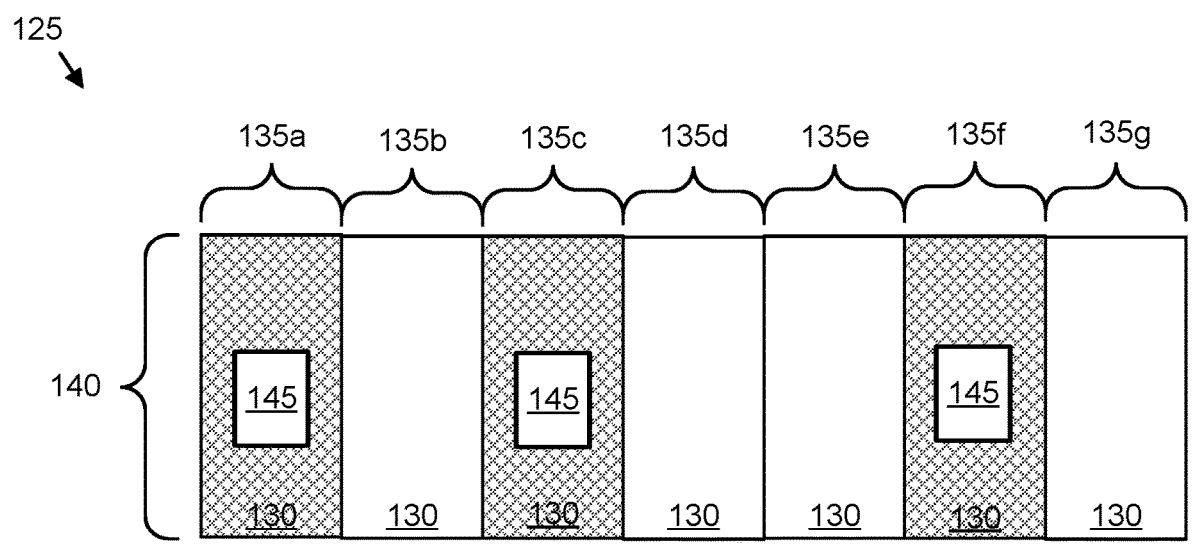

FIG. 3C shows three reference signal locations 145 at three predetermined TTI instances 135 within a given subband 140 of the subframe 125. The three predetermined TTI instances 135 are depicted as the first, third, and seventh TTI 135*a/c/g*. However, the three predetermined TTI instances 135 may be any TTI 135*a-g* of the subframe 125. For example, FIG. 3D shows the three reference signal locations 145 in predetermined TTI instances 135 at the first, third, and sixth TTI 135*a/c/f*. The predetermined TTI instances 135 may be periodic within a subband 140. Alternatively, the predetermined TTI instances 135 may be aperiodic within the subband 140.

Figure 3E:
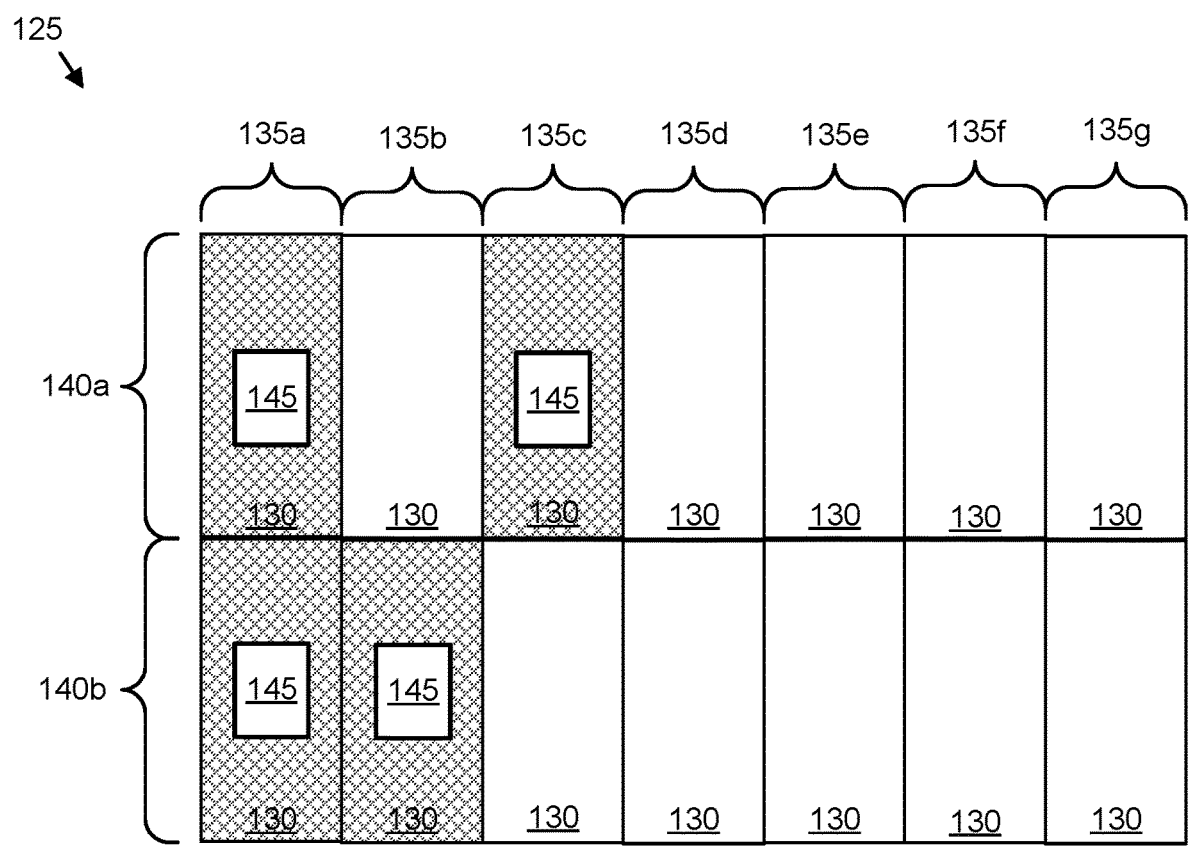

FIG. 3E shows one embodiment of reference signal locations 145 for two subbands 140*a-b* of the subframe 125. In one embodiment, the one or more reference signal locations 145 are determined to be in predetermined subband instances 140*a-b* of predetermined TTI instances 135. A pattern of presence and absence of reference signal locations 145 may be different between each subband 140*a-b* for a subset of subbands 140 of the plurality of subbands 140. For example, the presence/absence pattern of reference signal locations 145 may be different for each subband 140 of a first set of subbands 140, and for each subband 140 of a second set of subbands 140, but the second set of subbands 140 may include at least one presence/absence pattern of reference signal locations 145 from the first set of subbands 140.

In the depicted embodiment, each subband 140*a-b* includes reference signal locations 145 at predetermined TTI instances 135 in the first TTI 135. However, reference signal locations 145 are allocated so that predetermined TTI instances 135 for subsequent reference signal locations 145 are not located in concurrent TTI 135. In one embodiment, the one or more reference signal locations 145 of a second predetermined subband instance 140*b* of a second predetermined TTI instance 135 are further determined based on the one or more reference signal locations 145 of a first predetermined subband instance 135 of the first predetermined TTI instance 145. For example, if the third TTI 135*c* is selected as the second predetermined TTI instance 135 for the first predetermined subband instance 140*a*, the second TTI 135*b* may be selected as the second predetermined TTI instance 135 for a second predetermined subband instance 140*b* based on the selection of the third TTI 135*c* as the second predetermined TTI instance 135 for the first predetermined subband instance 140*a*.

In one embodiment, some predetermined TTI instances 135 may be different between one or more subbands 140 in a set of subbands 140. In addition, all predetermined TTI instances 135 may be different between one or more subbands 140 in a set of subbands 140. In a certain embodiment, the number of predetermined TTI instances 135 may be different between one or more subbands 140 in a set of subbands 140. Table 1 shows additional examples of differences in predetermined TTI instances 135 between subbands 140, where TTI 135 index numbers are listed for each subband 140. The table is exemplary and not limiting.

TABLE 1

| Predetermined TTI Instances 135 for First Subband 140a | Predetermined TTI Instances 135 for Second Subband 140b |
| --- | --- |
| TTI: 1, 3, 5 | TTI: 2, 4, 5 |
| TTI: 1, 2, 4 | TTI: 1, 3, 4, 5 |
| TTI: 2, 4, 6 | TTI: 1, 3, 5, 7 |

The predetermined TTI instances 135 may be periodic between subbands 140. Alternatively, the predetermined TTI instances 135 may be aperiodic between the subbands 140.

In one embodiment, if a single transport block is sent across two or more resource block groups (or subbands), then the benefit of using different reference signal presence/absence patterns (or different predetermined TTIs) for different resource block groups (or subbands) may become smaller depending on factors such as the coding rate associated to the transport block.

Figure 3F:
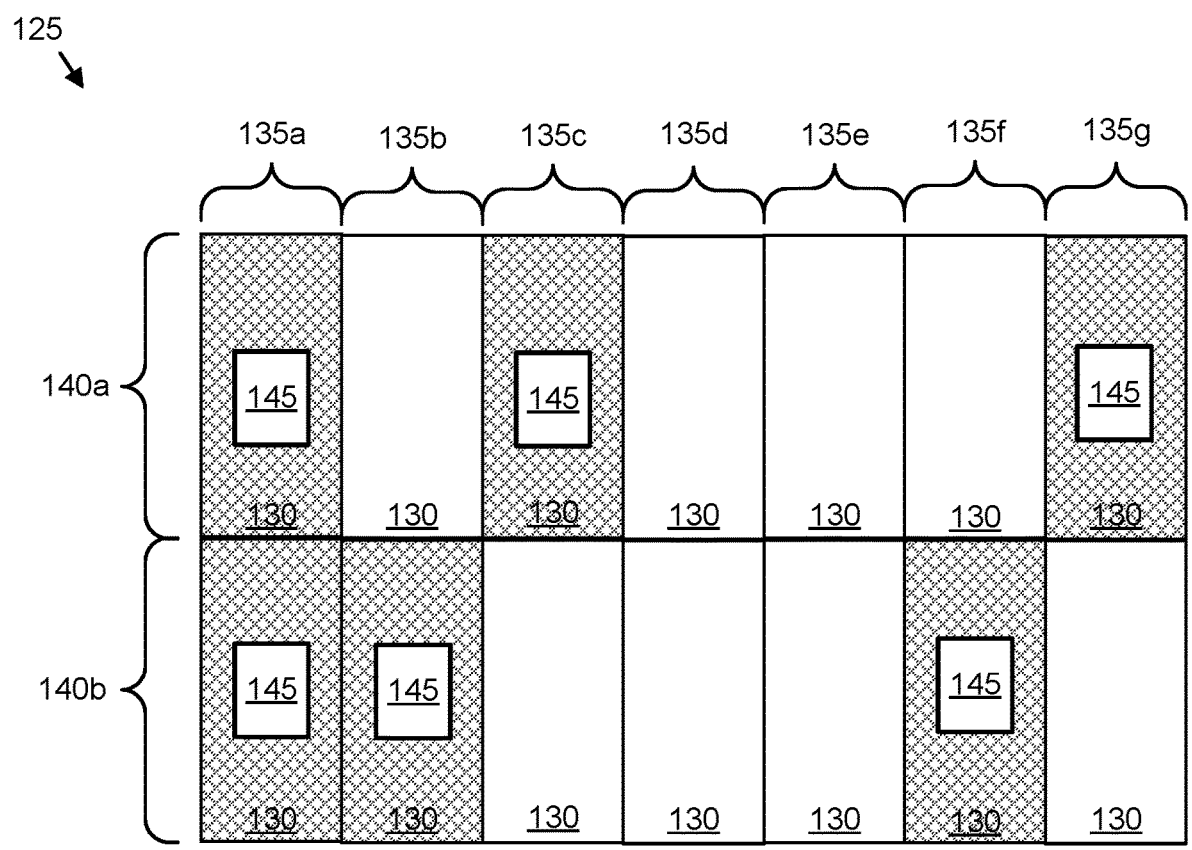

FIG. 3F shows one embodiment of reference signal locations 145 for two subbands 140a-b of the subframe 125. In the depicted embodiment, each subband 140a-b includes reference signal locations 145 at predetermined TTI instances 135 in the first TTI 135a. However, reference signal locations 145 are allocated so that predetermined TTI instances 135 for subsequent reference signal locations 145 are not located in concurrent TTI 135. In the depicted embodiment, the predetermined TTI instances 135 for the first subband 140a are at the first, third, and seventh TTI 135a/c/g while the predetermined TTI instances 135 for the second subband 140b are at the first, second, and sixth TTI 135a/c/f.

Figure 3G:
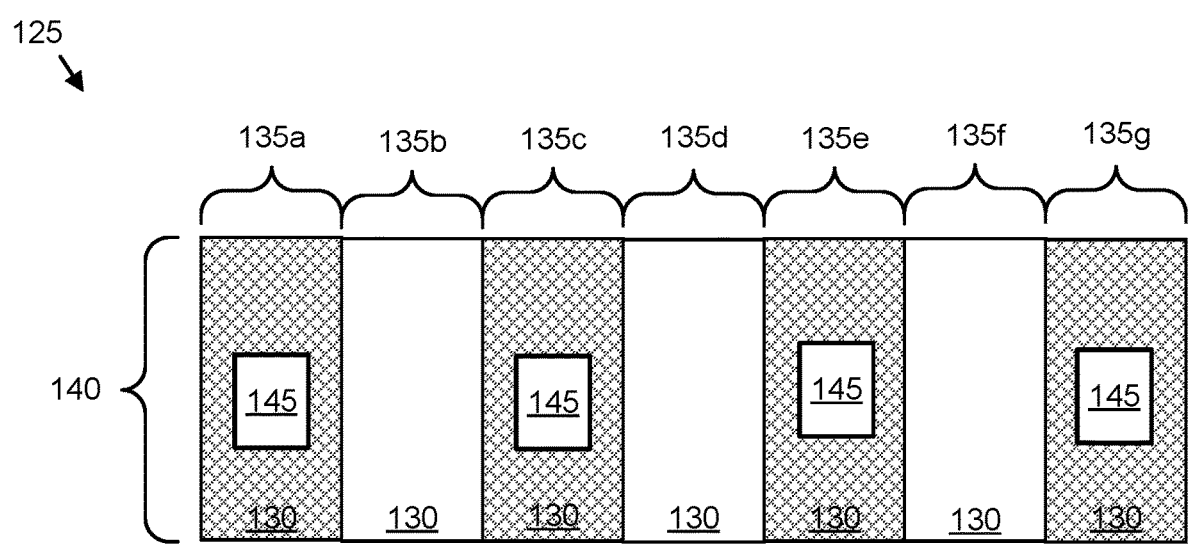

FIG. 3G shows four reference signal locations 145 at four predetermined TTI instances 135 within a given subband 140 of the subframe 125. The four predetermined TTI instances 135 are depicted as the first, third, fifth, and seventh TTI 135a/c/e/g.

Figure 3H:
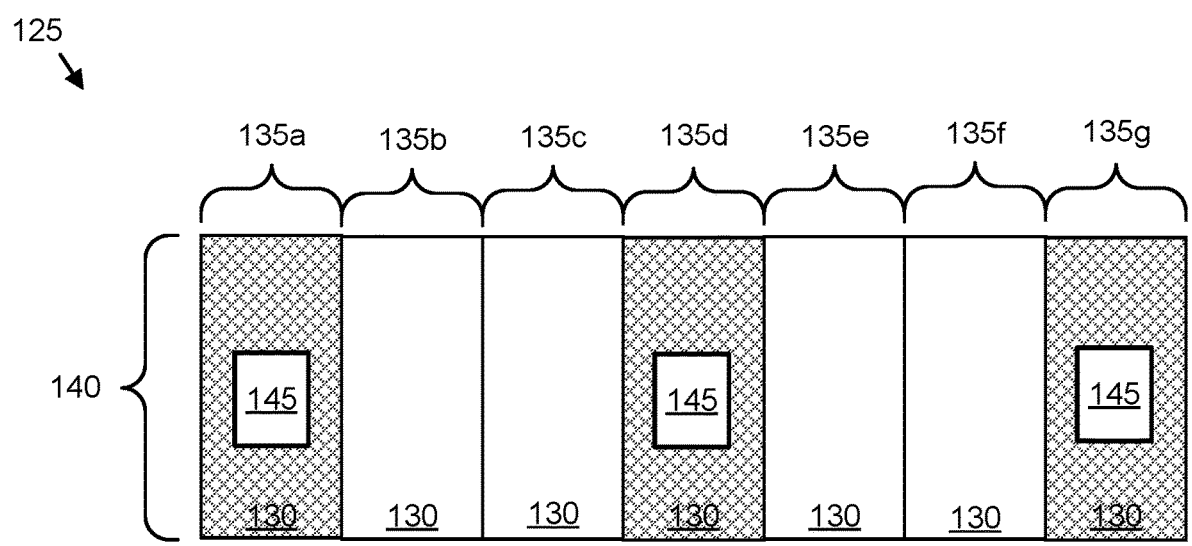

FIG. 3H shows three reference signal locations 145 at three predetermined TTI instances 135 within a given subband 140 of the subframe 125. The three predetermined TTI instances 135 are depicted as the first, fourth, and seventh TTI 135a/d/g.

Figure 3I:
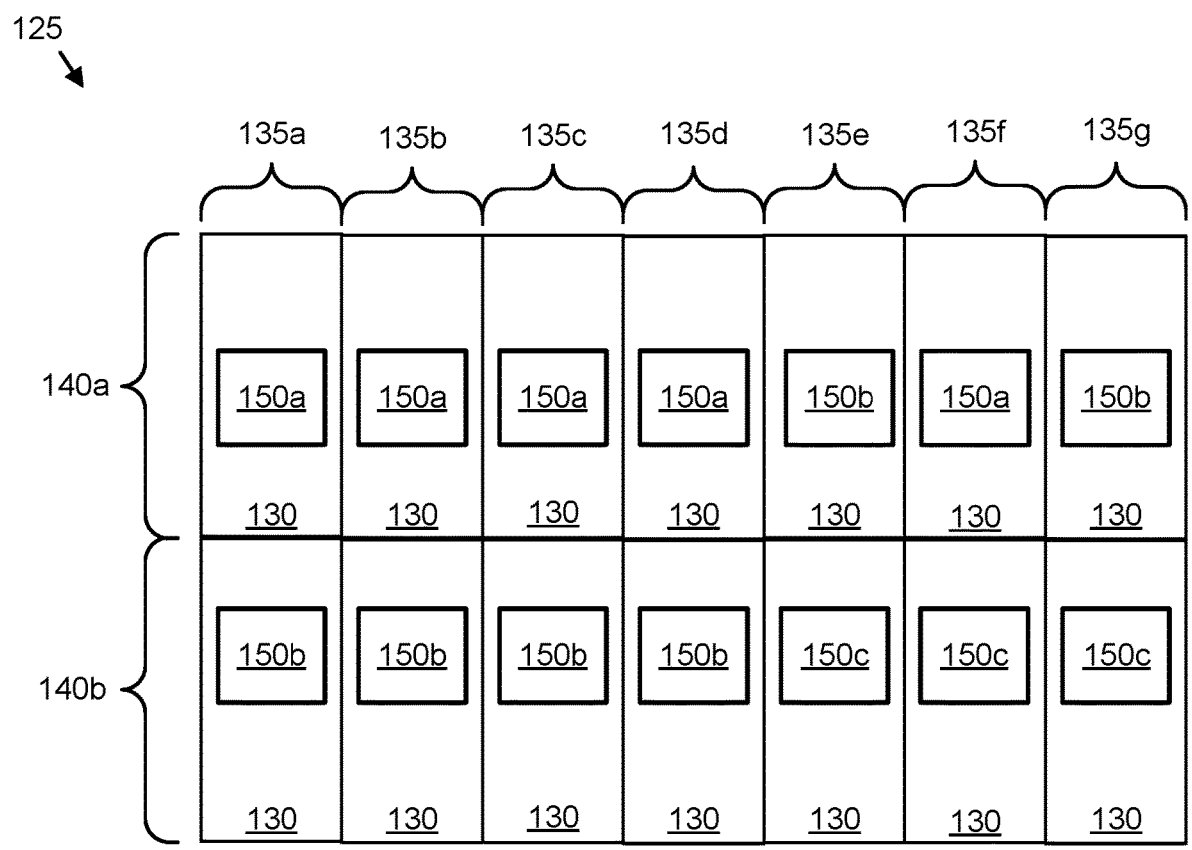
FIG. 3I is a schematic block diagram illustrating one embodiment of allocating data in scheduled Transmission Time Intervals (TTI)

FIG. 3I is a schematic block diagram illustrating one embodiment of allocating data 150 in scheduled TTI 135. Some of the scheduled TTI 135 may include a reference signal 155 as well as data. In the depicted embodiment, data 150 for three user equipment instances 110a-c are allocated to two subbands 140 of the subframe 125. First data 150a for a first user equipment instance 110a are allocated to the first, second, third, fourth, and sixth TTI 135a/b/c/d/f of the first subband 140a. Second data 150b for a second user equipment instance 110b are allocated to fifth and seventh TTI 135e/g of the first subband 140a and the first, second, third, and fourth TTI 135a-d of the second subband 140b. In addition, third data 150c for third user equipment instance 110c are allocated to the fifth, sixth, and seventh TTI 135e-g of the second subband 140b.

In one embodiment, first TTI 135a may need more reference signal locations 145 to achieve a particular channel estimation performance as the subsequent TTI 135 may need less reference signals 135 as the subsequent TTI 135 may reuse the reference signals 135 of previously scheduled TTI 135 if a channel doesn't change fast, such as in a low Doppler situation.

Figure 4:
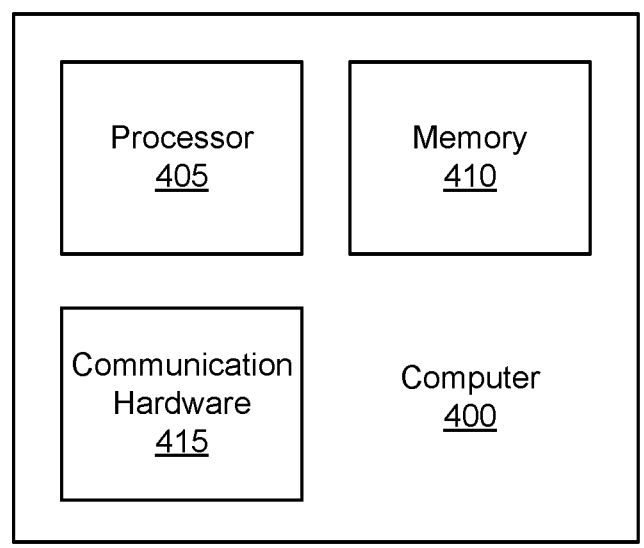
FIG. 4 is a schematic block diagram illustrating one embodiment of a computer.

FIG. 4 is a schematic block diagram illustrating one embodiment of a computer 400. The computer 400 may be embodied in the user equipment 110 and/or the base station 105. In the depicted embodiment, the computer 400 includes a processor 405, a memory 410, and communication hardware 415. The memory 410 may include a semiconductor storage device, a hard disk drive, an optical storage device, a micromechanical storage device, or combinations thereof. The memory 410 may store code and data. The processor 405 may execute the code and process the data.

The communication hardware 415 may include one or more transmitters and one or more receivers for transmitting data 150 between the base station 105 and the user equipment 110 through the network 115. Each transmitter and/or receiver may include one or more antenna ports.

FIG. 5A is a schematic flow chart diagram illustrating one embodiment of a reference signal location determination method 500. The reference signal location determination method 500 may determine one or more reference signal locations 145 and predetermined TTI instances 135 and communicate reference signals 155 in the predetermined TTI instances 135. The method 500 may be performed by the base station 105, user equipment 110, or combinations thereof. In addition, the method 500 may be performed by processors 405 of the base station 105 and/or the user equipment 110.

The method 500 starts, and in one embodiment, the processor 405 determines 505 the number of signal reference locations 145 as a function of the number of the plurality of TTI 135 for the scheduled transmission 165. In addition, the number of signal reference locations 145 may be determined 505 as a function of the number of the plurality of TTI 135 and one or more of the subframe index, the time interval between the TTI 135 in the scheduled transmission 165, the subband size, and the TDD configuration for the scheduled transmission 165.

In one embodiment, the processor 405 of the base station 105 determines 510 reference signal locations 145 for reference signals 155 that are communicated in a subframe 120 of the scheduled transmission 165. As used herein, "determines" refers to calculating, looking up, and/or making a logical decision based on one or more inputs.

The processor 405 may determine 505 the number of signal reference locations 145 for a scheduled message as a function of the number of the plurality of TTI 135 and/or predetermined TTI instances 135. In one embodiment, for each number of signal reference locations 145 and/or predetermined TTI instances 135, there is a unique number of the plurality of TTI 135 for the scheduled message. The number of the plurality of TTI 135 for the scheduled message may be determined from a lookup table.

In one embodiment, the processor 405 determines 510 the reference signal locations 145 by determining a number of reference signal locations 145 for the subframe 120 based on an operation standard. For example, the operation standard may specify that reference signals 155 be communicated in three reference signal locations 145 at three predetermined TTI instances 135 for each subband 140.

In an alternative embodiment, the processor 405 may determine the number of reference signal locations 145 for the subframe 120 based on available bandwidth of the network 115. For example, if the available bandwidth exceeds a bandwidth threshold, the processor 405 may determine 505 that a larger number of reference signal locations 145 may be allocated for the subframe 120.

Figure 5B:
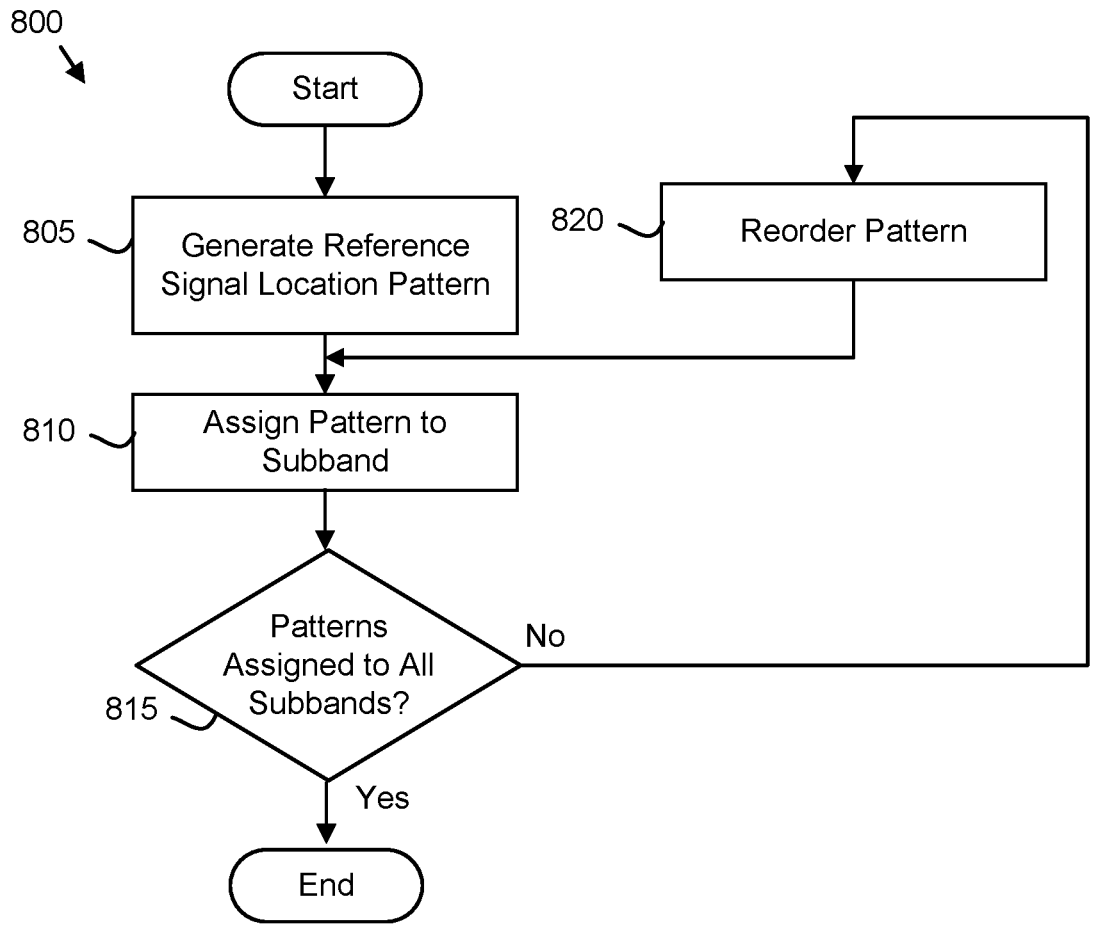
FIG. 5B is a schematic flow chart diagram illustrating one embodiment of a pattern assignment method.
Figure 5C:
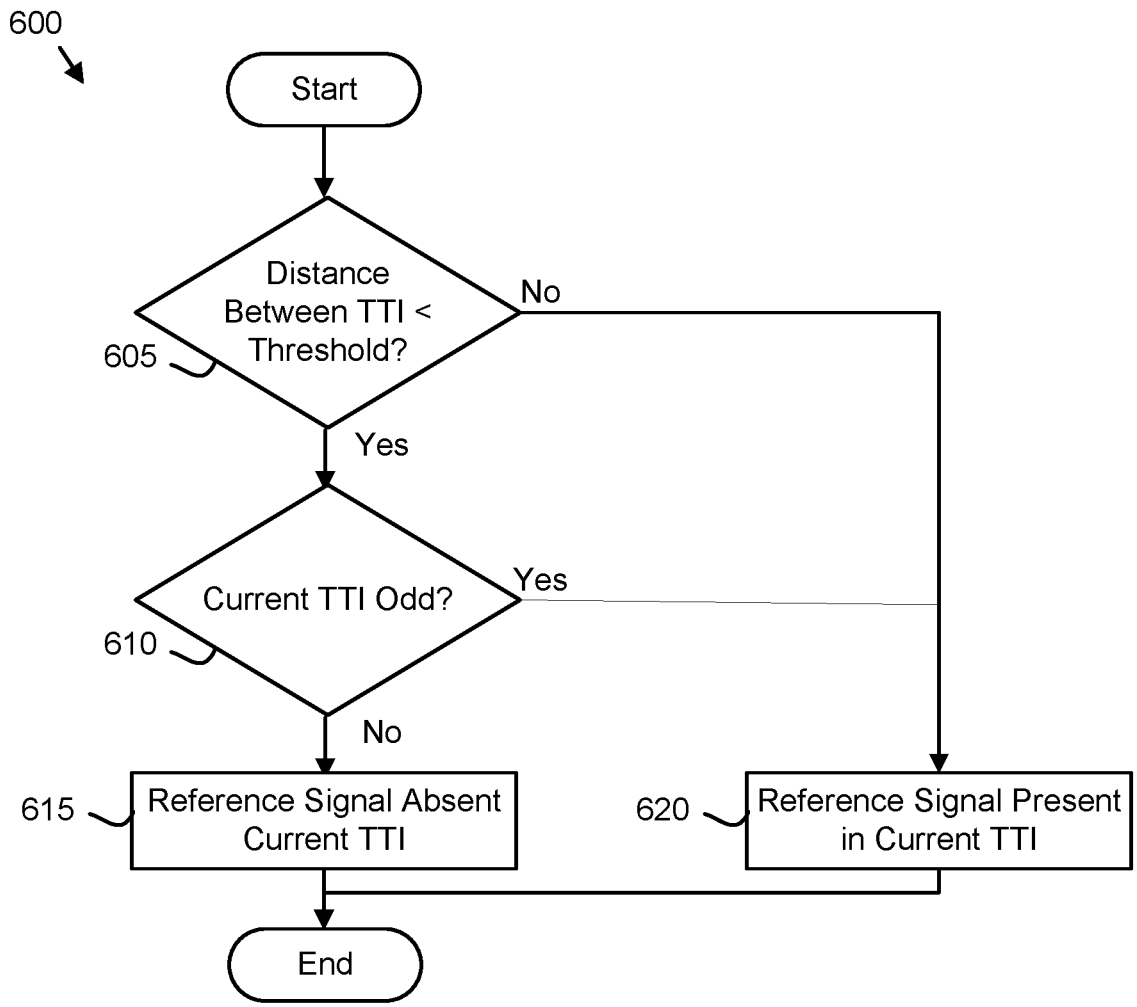
FIG. 5C is a schematic flow chart diagram illustrating one embodiment of a reference signal presence/absence determination method.
Figure 5D:
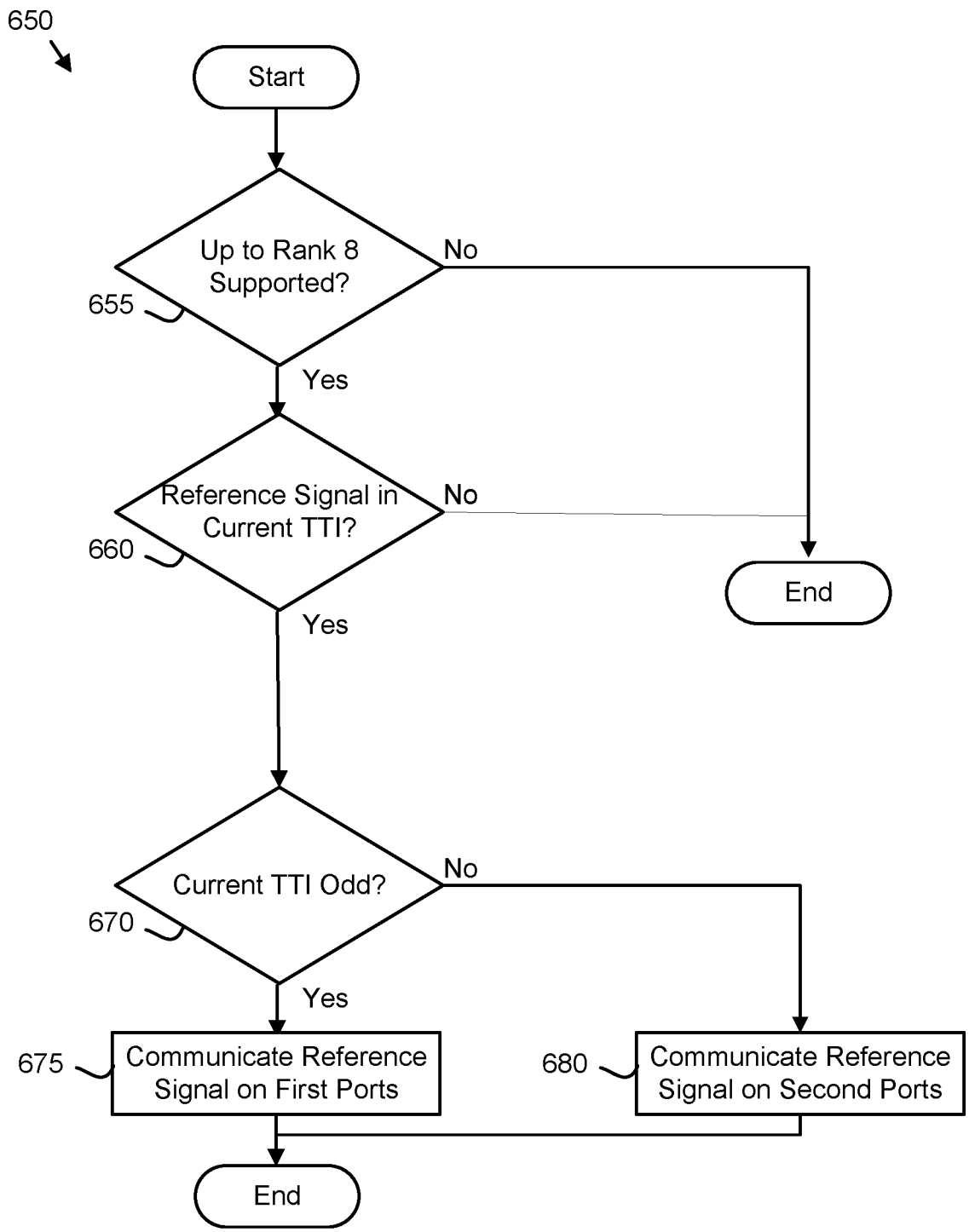
FIG. 5D is a schematic flow chart diagram illustrating one embodiment of a reference signal port determination method.
Figure 5E:
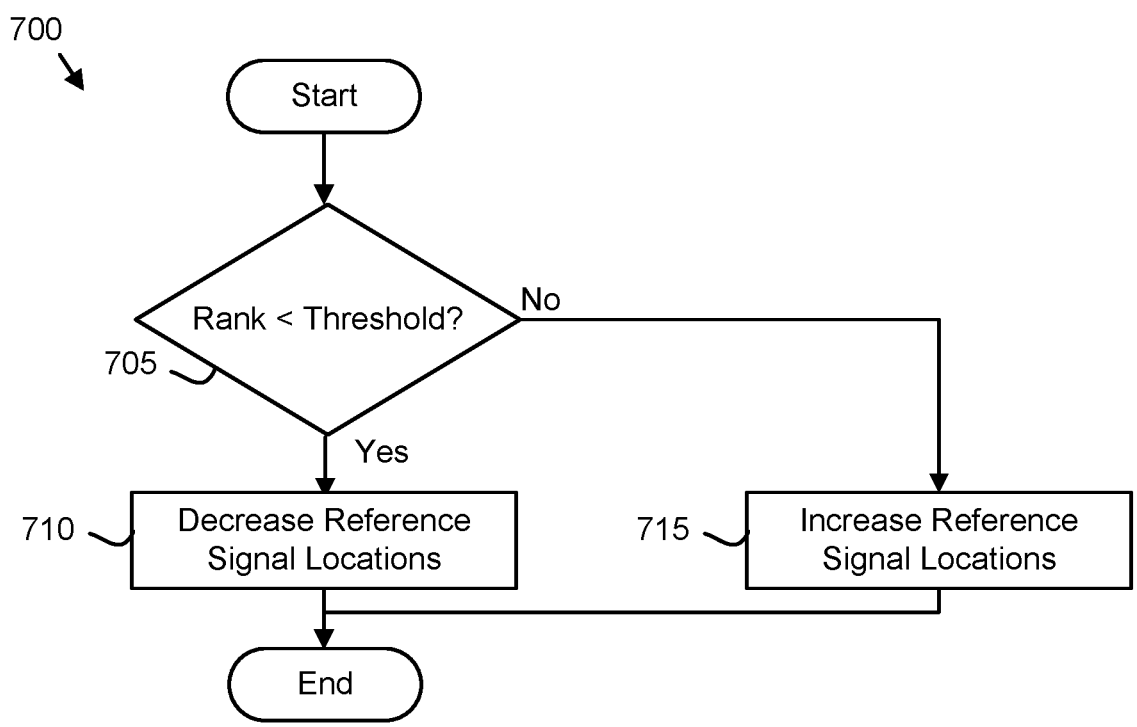
FIG. 5E is a schematic flow chart diagram illustrating one embodiment of a reference signal number determination method.

FIG. 5E describes an alternative embodiment for determining 510 the number of reference signal locations 145. The embodiments for determining the number of reference signal locations 145 may be used singly or in combination.

The processor 405 may determine 510 the reference signal locations 145 based on the number predetermined TTI instances 135. For example, a lookup table may specify the reference signal locations 145 for the predetermined TTI instances 135 for using the number of predetermined TTI instances 135 as an index.

The processor 405 may determine the number of signal reference locations 145 and/or the number predetermined TTI instances 135 for a scheduled transmission 135 as a function of the number of TTI 135 in the plurality of TTI

135. The processor 405 may determine the number of predetermined TTI instances 135, and/or the TTI 135 of the predetermined TTI instances 135 for a scheduled transmission 165 as a function of the number of TTI 135 in the plurality of TTI 135.

In one embodiment, the processor 405 determines the number of signal reference locations 145 and/or predetermined TTI instances 135 for the scheduled transmission 165 as a function of the number of TTI 135 in a plurality of TTI 135 and one or more of the subframe index, the time interval between the TTI 135 in the scheduled transmission 165, the subband size, and the TDD configuration for the scheduled transmission 165.

In one embodiment, the processor 405 may determine 510 the reference signal locations 145 as a function of one or more of the number of TTI 135, a subframe index, a time interval between the TTI 135 in the scheduled transmission 165, a subband size, and a TDD configuration for the scheduled transmission 165. The one or more reference signal locations 145 may be in predetermined TTI instances 135 of the plurality of TTI 135. A number of predetermined TTI instances 135 may be less than the number of the plurality of TTI 135. The reference signal 155 may be present only in the predetermined TTI instances 135.

In one embodiment, the reference signal locations 145 are determined 510 to be in predetermined TTI instances 135 of the plurality of TTI 135 and a number of predetermined TTI instances 135 is less than the number of the plurality of TTI, wherein the reference signal 155 is present only in the predetermined TTI instances 135. In response to one TTI 135 in the scheduled transmission 165, the one or more reference signal locations 145 may be determined 505 to be in a first predetermined TTI instance 135 at the first TTI 135*a* of the plurality of TTI 135, such as is illustrated in FIG. 3A. In response to three consecutive TTI 135 in the scheduled transmission 165, the one or more reference signal locations 145 may be determined 505 to be in the first predetermined TTI instance 135 at the first TTI 135*a* and a third predetermined TTI instance 135 and the third TTI 135*c* of the plurality of TTI 135, such as is illustrated in FIG. 3B. In response to seven consecutive TTI 135 in the scheduled transmission 165, the one or more reference signal locations 145 may be determined 505 to be in the first predetermined TTI instance 135 at the first TTI 135*a*, the third predetermined TTI instance at the third TTI 135*c*, and a seventh predetermined TTI instance 135 at the seventh TTI 135*g* of the plurality of TTI 135, such as is illustrated in FIG. 3C. Alternatively, In response to seven consecutive TTI 135 in the scheduled transmission 165, the at least one reference signal 155 may be determined 505 to be in the first predetermined TTI instance 135 at the first TTI 135*a*, the third predetermined TTI instance 135 at the third TTI 135*c*, and a sixth predetermined TTI instance 135 at the sixth TTI 135*f* of the plurality of TTI 135.

In one embodiment, the one or more reference signal locations 145 are determined 510 to be in predetermined subband instances 140 of predetermined TTI instances 135. The one or more reference signal locations 145 of a second predetermined subband instance 140*b* of a second predetermined TTI instance 135 may be determined 505 based on the one or more reference signal locations of a first predetermined subband instance 140*a* of the first predetermined TTI instance 135, such as is illustrated in FIGS. 3E-F.

In one embodiment, the one or more reference signal locations 145 for a transmission layer of the scheduled transmission 165 of a plurality of TTI 135 are further determined 510 based on a parameter communicated in the resource assignment message 160. For example, the reference signal locations 145 may be calculated as a function of the parameter communicated in the resource assignment message 160. In addition, the number of one or more reference signal locations 145 for a subband 140 of the plurality of TTI 135 may be further determined 505 from the resource assignment message 160. For example, a value in the resource assignment message 160 may specify the number of the one or more reference signal locations 145 for the subband 140.

In one embodiment, a first and second plurality of TTI 135 with a same number of TTI 135 and a same rank, may have different numbers of reference signal locations 145 based on the resource assignment message 165. For example, for the first plurality of TTI 135 may have a first number of reference signals 155 based on a first resource assignment message 165 and the second plurality of TTI 135 may have a second number of reference signals 155 for the second plurality of TTI 135 based on a second resource assignment message 165.

In a certain embodiment, a given reference signal 155 of the one or more reference signals 155 is mapped to two given reference signal locations 145 of two TTI 135 of the plurality of TTI 135.

The one or more reference signal locations 145 may be determined 510 to be in predetermined subband instances 140 of predetermined TTI instances 135. The one or more reference signal locations 145 of a second predetermined subband instance 140*b* of a second predetermined TTI instance 135 may be determined based on the one or more reference signal locations 145 of a first predetermined subband instance 140*a* of the first predetermined TTI instance 135. For example, if the first predetermined TTI instance 135 of a first reference signal location 145 the first predetermined subband instance 140 is at a third TTI 135*c*, the second predetermined TTI instance 135 for a second reference signal location 145 in the second predetermined subband instance 140*b* may be in the second TTI 135*b* based on the first predetermined TTI instance 135 being in the third TTI 135*c*, such as is illustrated in FIG. 3E.

In one embodiment, a first number of reference signals 155 for the first plurality of TTI 135 is different from a second number of reference signals 155 for the second plurality of TTI 135 with a same rank as the first plurality of TTI 135. The difference between the number of reference signals 155 for the first plurality of TTI 135 and the number of reference signals for the second plurality of TTI 135 may be communicated via the resource assignment message 160. For example, a first resource assignment message 160 for a first plurality of TTI 135 may be used to determine the first number of reference signals 155 for the first plurality of TTI 135 and a second resource assignment message 160 for a second plurality of TTI 135 may be used to determine the second number of reference signals 155 for the second plurality of TTI 135.

The processor 405 may schedule 515 the scheduled transmission 165 of the plurality of TTI 135 to a user equipment 110. The predetermined TTI instances 135 of the plurality of TTI 135 may contain the one or more reference signal locations 145 for the scheduled transmission 165. In one embodiment, a given reference signal 155 of the one or more reference signals 155 is mapped to two given reference signal locations 145 of two TTI 135 of the plurality of TTI 135. The two TTI 135 may be predetermined TTI instances 135. In one embodiment the user equipment 110 may determine if a given reference signal 155 of the one or more reference signals 155 is mapped to two given reference signal locations 145 of two TTI 135 of the plurality of TTI 135 based on the resource assignment message 165.

In one embodiment, a field in the DCI indicates the number of TTI 135 and/or the one or more reference signal locations 145. In addition, a Radio Network Temporary Identifier (RNTI) may indicate the number of TTI 135 and/or the one or more reference signal locations 145. Alternative, a fixed value for a field in multi-TTI grant indicates the number of TTI 135 and/or one or more reference signal locations 145. In a certain embodiment, a function of a time and/or frequency wherein the multi-TTI grant is transmitted indicates the one or more reference signal locations 145 and/or the number of TTI 135.

In one embodiment, a field in the DCI indicates if the number of scheduled TTI 135 is greater than 1. In addition, a RNTI may indicate if the number of scheduled TTI 135 is greater than 1. Alternative, a fixed value for a field in multi-TTI grant indicates if the number of scheduled TTI 135 is greater than 1. In a certain embodiment, a function of a time and/or frequency wherein the multi-TTI grant is transmitted indicates if the number of scheduled TTI 135 is greater than 1.

The processor 405 may transmit 520 a resource assignment message 160 to the user equipment 110 and the user equipment 110 may receive 555 the resource assignment message. The processor 405 of the user equipment 110 may determine 560 the number of the plurality of TTI 135 in the scheduled transmission 165. The number of the plurality of TTI 135 may be determined 560 from the resource assignment message 160.

In one embodiment, the processor 405 determines 565 the reference signal locations 145 for the scheduled transmission 165 based on the number of the plurality of TTI 135. The processor 405 of the user equipment 110 may employ the functions and/or criteria that the processor 405 of the base station 105 employed and/or inverse functions and/or criteria from the functions and/or criteria that the processor 405 of the base station 105 employed to determine the number of the plurality of TTI 135.

In one embodiment, the reference signal locations 145 are determined 565 based only on the number of TTI 135. For example, the reference signal locations 145 may be retrieved from a lookup table that uses the number of TTI 135 is an index.

In a certain embodiment, the reference signal locations 145 are determined 565 from the number of TTI 135 and one or more of the resource assignment message 160, a parameter received from a higher layer wherein the higher layer is higher than the physical layer, the subframe index, the time interval between the TTI 135 in the scheduled transmission 165, the subband size, and the TDD configuration for the scheduled transmission 165.

In one embodiment, the reference signal locations 145 are determined 565 to be in predetermined TTI instances 135 of the plurality of TTI 135 and a number of predetermined TTI instances 135 is less than the number of the plurality of TTI, wherein the reference signal 155 is present only in the predetermined TTI instances 135. In response to one TTI 135 in the scheduled transmission 165, the one or more reference signal locations 145 may be determined 565 to be in a first predetermined TTI instance 135 at the first TTI 135*a* of the plurality of TTI 135, such as is illustrated in FIG. 3A. In response to three consecutive TTI 135 in the scheduled transmission 165, the one or more reference signal locations 145 may be determined 565 to be in the first predetermined TTI instance 135 at the first TTI 135*a* and a third predetermined TTI instance 135 and the third TTI 135*c* of the plurality of TTI 135, such as is illustrated in FIG. 3B. In response to seven consecutive TTI 135 in the scheduled transmission 165, the one or more reference signal locations 145 may be determined 565 to be in the first predetermined TTI instance 135 at the first TTI 135*a*, the third predetermined TTI instance at the third TTI 135*c*, and a seventh predetermined TTI instance 135 at the seventh TTI 135*g* of the plurality of TTI 135, such as is illustrated in FIG. 3C. Alternatively, In response to seven consecutive TTI 135 in the scheduled transmission 165, the at least one reference signal 155 may be determined 565 to be in the first predetermined TTI instance 135 at the first TTI 135*a*, the third predetermined TTI instance 135 at the third TTI 135*c*, and a sixth predetermined TTI instance 135 at the sixth TTI 135*f* of the plurality of TTI 135.

In one embodiment, the one or more reference signal locations 145 are determined 565 to be in predetermined subband instances 140 of predetermined TTI instances 135. The one or more reference signal locations 145 of a second predetermined subband instance 140*b* of a second predetermined TTI instance 135 may be determined 565 based on the one or more reference signal locations of a first predetermined subband instance 140*a* of the first predetermined TTI instance 135, such as is illustrated in FIGS. 3E-F.

In one embodiment, the one or more reference signal locations 145 for a transmission layer of the scheduled transmission 165 of a plurality of TTI 135 are further determined 565 based on a parameter received in the resource assignment message 160. For example, the reference signal locations 145 may be calculated as a function of the parameter received in the resource assignment message 160. In addition, the number of one or more reference signal locations 145 for a subband 140 of the plurality of TTI 135 may be further determined 565 from the resource assignment message 160. For example, a value in the resource assignment message 160 may specify the number of the one or more reference signal locations 145 for the subband 140.

In one embodiment, the one or more reference signal locations 145 are further determined 565 from a field in the DCI indicating the number of TTI 135 and/or one or more reference signal locations 145. In addition, the number of TTI 135 and/or the one or more reference signal locations 145 may be further determined 565 from the RTNI. Alternative, the number of TTI 135 and/or the one or more reference signal locations 145 may be further determined 565 from a fixed value for a multi-TTI grant. In a certain embodiment, the number of TTI 135 and/or the one or more reference signal locations 145 are further determined 565 as a function of a time and/or frequency wherein a grant is transmitted.

In one embodiment, the field in the DCI indicates if the number of scheduled TTI 135 is greater than 1. In addition, a RNTI may indicate if the number of scheduled TTI 135 is greater than 1. Alternative, a fixed value for a field in multi-TTI grant indicates if the number of scheduled TTI 135 is greater than 1. In a certain embodiment, a function of a time and/or frequency wherein the multi-TTI grant is transmitted indicates if the number of scheduled TTI 135 is greater than 1.

In one embodiment, in response to different resource assignment messages 160 for a first and second plurality of TTI 135 with a same number of TTI 135 and a same rank, a first number of reference signals 155 for the first plurality of TTI 135 is different from a second number of reference signals 155 for the second plurality of TTI 135. In a certain embodiment, a given reference signal 155 of the one or more reference signals 155 is mapped to two given reference signal locations 145 of two TTI 135 of the plurality of TTI 135.

FIGS. 5B and 5C describe additional embodiments for determining 565 the reference signal locations 145. The embodiments for determining 565 the reference signal locations 145 may be used singly or in any combination.

In one embodiment, the data may be precoded with a given precoding matrix for a first TTI 135 of the predetermined TTI instances 135 and a second TTI 135 not of the predetermined TTI instances 135. The base station 105 may transmit 525 the data of the scheduled transmission 165 to the user equipment 110. The data may be transmitted on the plurality of TTI 135. The reference signals 145 may be transmitted in the one or more reference signal locations 145 at the predetermined TTI instances 135. The number of predetermined TTI instances 135 and/or corresponding reference signal locations 145 may be less than a number of TTI 135 in the scheduled transmission 165. The user equipment 110 may receive 570 the data.

In one embodiment, the processor 405 demodulates 575 at least one TTI 135 in the scheduled transmission 165 using at least one reference signal 155 from the one or more reference signal locations 145. The at least one TTI 135 may be demodulated 575 based on both a previous reference signal 160 and at least one of a current reference signal 160 and a future reference signal 160. For example, scheduling information from each of the previous reference signal 164 a previous scheduled transmission 165 and a current reference signal 164 the current scheduled transmission 165 may be used to demodulate 575 the TTI 135.

The user equipment 110 may transmit 580 an acknowledgment message 175 to the base station 105. In one embodiment, the user equipment 110 transmits 580 an acknowledgment message 175 corresponding to data demodulated for each TTI 135 of the plurality of TTI 135. The base station 105 may receive 530 the acknowledgment message 175 and the method 500 ends. The method 500 may be used for multi-TTI grant scheduling, and to reduce reference signal latency.

FIG. 5B is a schematic flow chart diagram illustrating one embodiment of a pattern assignment method 800. The method 800 may generate patterns of reference signal locations 145 and assign the patterns to sub bands 140. The method 800 may be employed in steps 505 and 565 of FIG. 5A. The method 800 may be performed by the base station 105, user equipment 110, or combinations thereof. In addition, the method 800 may be performed by processors 405 of the base station 105 and/or the user equipment 110.

The method 800 starts, and in one embodiment, the processor 405 generates 805 a reference signal location pattern of reference signal locations 145. The reference signal location pattern may include a plurality of predetermined TTI instances 135. As used herein, generating refers to calculating, looking up, and/or making a logical decision based on inputs. The reference signal location pattern may be generated 805 based on the number of TTI 135. Alternatively, the reference signal location pattern may be generating based on the number of reference signal locations, the operation standard, the available bandwidth, and/or the likelihood of interference. In one embodiment, the reference signal location pattern may be generated 805 from the number of TTI 135 and one or more of the resource assignment message 160, a parameter received from a higher layer wherein the higher layer is higher than the physical layer, the subframe index, the time interval between the TTI 135 in the scheduled transmission 165, the subband size, and the TDD configuration for the scheduled transmission 165.

In the reference signal location pattern, the reference signal location 145 may be present in some TTI 135 and absent in other TTI 135 of a slot 125 and/or subframe 120. FIGS. 3E-F illustrate examples of reference signal location patterns. The processor 405 further assigns 810 reference signal location pattern to a sub band 140. For example, the processor may assign 810 a first reference signal location pattern to a first sub band 140a. The processor 405 further determines 815 if reference signal location patterns are assigned to all sub bands 140. If reference signal location patterns are not assigned to all sub bands 140, the processor 405 may reorder 820 the reference signal location pattern. For example, the predetermined TTI instances 135 and/or reference signal locations 145 of the first subband 140a of FIG. 3F may represent a first reference signal location pattern. The first reference signal location pattern may be reordered 820 to generate a second reference signal location pattern represented by the predetermined TTI instances 135 and/or reference signal locations 145 of the second subband 140b of FIG. 3F. in another embodiment, the second reference signal location pattern represented by the predetermined TTI instances 135 and/or reference signal locations 145 of the second subband 140b of FIG. 3F can be determined based on one or more of The first reference signal location pattern and/or a resource assignment message 165.

The processor 405 continues to assign reference signal location patterns to subbands 140 until patterns have been assigned to all subbands 140 and the method 800 ends.

FIG. 5C is a schematic flow chart diagram illustrating one embodiment of a reference signal presence/absence determination method 600. The method 600 determines the predetermined TTI instances 135 in which the reference signal 155 is present and the TTI 135 in which the reference signal 155 is absent. The method 600 may be employed in steps 505 and 565 of FIG. 5A. The method 600 may be performed by the base station 105, user equipment 110, or combinations thereof. In addition, the method 600 may be performed by processors 405 of the base station 105 and/or the user equipment 110.

The method 600 starts, and in one embodiment, the processor 405 determines if a distance between TTI 135 in the scheduled transmission 165 is less than a distance threshold. The distance may be a number of TTI 135 between a last previous TTI 135 and a current TTI 135. If the distance between the TTI 135 is not less than the distance threshold, a predetermined TTI instance 135 for a reference signal location 145 and/or a reference signal 155 is determined to be present 620 at the current TTI 135. If the distance between the TTI 135 is less than the distance threshold, the processor 405 determines if the current TTI 135 is an odd TTI 135, such as the first, third, fifth, and/or seventh TTI 135a/c/e/g. If the current TTI 135 is an odd TTI 135, the reference signal location 145 and/or reference signal 155 may be present 620 at the current TTI 135.

If the current TTI 135 is not an odd TTI 135, a predetermined TTI instance 135 for a reference signal location 145 and/or reference signal 155 is determined to be absent 615 from the current TTI 135 and the method 600 ends. As a result, the reference signal locations 145 may be determined based on the distance between TTI 135 and a position of the TTI 135 within a slot 125.

FIG. 5D is a schematic flow chart diagram illustrating one embodiment of a reference signal port determination method 650. The method 650 determines the antenna port over which the reference signal 155 is transmitted. The method 650 may be performed by the base station 105, user equipment 110, or combinations thereof. In addition, the method 650 may be performed by processors 405 of the base station 105 and/or the user equipment 110.

The method 650 starts, and in one embodiment, the processor 405 determines 655 if the scheduled transmission 165 supports up to rank 8. The user equipment 110 may report the rank to the base station 105. The base station 105 may decode the reported rank to determine which antenna ports to use to receive transmissions from the user equipment 110.

If up to rank 8 is not supported, the method 650 ends. If up to rank 8 is supported, the processor 405 determines 660 if a reference signal 155 and/or reference signal location 145 is at a current TTI 135. If the reference signal 155 and/or reference signal location 145 is not at the current TTI 135, the method 650 ends.

If the reference signal 155 and/or reference signal location 145 is at the current TTI 135, the processor 405 determines 670 if the current TTI 135 is an odd TTI 135. An odd TTI 135 has an index number of 1, 3, 5, etc. If the current TTI 135 is not an odd TTI 135, the processor 405 may communicate 680 the reference signal 155 over one or more second antenna ports of the communication hardware 415 and the method 650 ends. If the current TTI 135 is an odd TTI 135, the processor 405 may communicate 675 the reference signal 155 over one or more first antenna ports of the communication hardware 415 and the method 650 ends.

FIG. 5E is a schematic flow chart diagram illustrating one embodiment of a reference signal number determination method. The method 700 may determine a number of reference signal locations 145 for a scheduled transmission 165. The method 700 may be employed by step 505 in FIG. 5A. Alternatively, the method 700 may be employed by step 565 of FIG. 5A. The method 700 may be performed by the base station 105, user equipment 110, or combinations thereof. In addition, the method 700 may be performed by processors 405 of the base station 105 and/or the user equipment 110.

The method 700 starts, and in one embodiment, the processor 405 determines 705 if the rank is less than a rank threshold. If the rank is less than the rank threshold, the processor 405 may decrease 710 reference signal locations 145 for a scheduled transmission 165 and the method 700 ends. For example, the processor 405 may decrease 710 the reference signal locations 145 to 12 reference signal locations 145. If the rank is not less than the rank threshold, the processor 405 may increase 715 reference signal locations 145 for the scheduled transmission 165 and the method 700 ends. For example, the processor 405 may increase 715 the reference signal locations to 16 reference signal locations 145.

The embodiments described herein reduce the overhead of the reference signals 155 by transmitting the reference signals 155 in reference signal locations 145 at predetermined TTI instances 135 that are a subset of the TTI 135 for a scheduled transmission 165. As a result, the number of reference signals 155 is reduced, reducing the reference signal overhead.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
    determining, by use of a processor, a location of Transmission Time Intervals (TTI) transmissions in a scheduled transmission of a plurality of TTI; and
    determining at least one reference signal locations based on the location of TTI transmissions, wherein the at least one reference signal locations are further determined from the location of TTI and at least one of a parameter from the list, a subframe index, a time interval between two TTIs of the scheduled transmission, a subband size, or a Time Division Duplex (TDD) configuration for the scheduled transmission.

2. The method of claim 1, wherein the at least one reference signal locations are further determined to be in predetermined TTI instances of the plurality of TTI and a number of predetermined TTI instances is less than the number of the plurality of TTI, wherein the reference signal is present only in the predetermined TTI instances.

3. The method of claim 1, wherein in response to one TTI in the scheduled transmission, the at least one reference signal locations are further determined to be in a first predetermined TTI instance of the plurality of TTI, in response to three consecutive TTI in the scheduled transmission, the at least one reference signal locations are determined to be in the first predetermined TTI instance and a third predetermined TTI instance of the plurality of TTI, and in response to seven consecutive TTI in the scheduled transmission, the at least one reference signal locations are determined to be in the first predetermined TTI instance, the third predetermined TTI instance, and a seventh predetermined TTI instance of the plurality of TTI.

4. The method of claim 1, wherein the at least one reference signal locations are further determined to be in predetermined subband instances of predetermined TTI instances.

5. The method of claim 4, wherein at least one reference signal locations of a second predetermined subband instance of a second predetermined TTI instance are further determined based on at least one reference signal locations of a first predetermined subband instance of the first predetermined TTI instance.

6. The method of claim 1, wherein the at least one reference signal locations for a transmission layer of the scheduled transmission of a plurality of TTI are further determined based on a parameter received in a resource assignment message.

7. The method of claim 6, wherein a number of at least one reference signal locations for a subband of the plurality of TTI are further determined from the resource assignment message.

8. The method of claim 7, wherein in response to different resource assignment messages for a first and second plurality of TTI with a same number of TTI and a same rank, a first number of reference signals for the first plurality of TTI is different from a second number of reference signals for the second plurality of TTI.

9. The method of claim 1, wherein a given reference signal of the at least one reference signals is mapped to two given reference signal locations of two TTI of the plurality of TTI.

10. The method of claim 1, the method further comprising demodulating at least one TTI in the scheduled transmission using at least one reference signal from the at least one reference signal locations.

11. The method of claim 10, wherein the at least one TTI is demodulated based on both a previous reference signal and at least one of a current reference signal and a future reference signal.

12. The method in claim 10, wherein the method further comprises transmitting an acknowledgement message corresponding to data demodulated for each TTI of the plurality of TTI.

13. A method comprising:
scheduling, by use of a processor, a scheduled transmission of a plurality of consecutive Transmission Time Intervals (TTI) to User Equipment (UE) via a single grant, wherein a location of predetermined TTI instances of the plurality of TTI contain at least one reference signal locations for the scheduled transmission; and
transmitting data to the UE on the plurality of TTI, wherein the location of reference signal locations is less than a location of TTI transmissions, wherein the at least one reference signal locations are further determined from the location of TTI transmissions and at least one of a parameter from the list, a subframe index, a time interval between two TTIs of the scheduled transmission, a subband size, or a Time Division Duplex (TDD) configuration for the scheduled transmission.

14. The method of claim 13, wherein the data is precoded with a given precoding matrix for a first TTI of the predetermined TTI instances and a second TTI not of the predetermined TTI instances.

15. The method of claim 13, wherein the at least one reference signal locations are further determined from the number of TTI and at least one of a resource assignment message.

16. An apparatus comprising:
a processor performing:
determining a location of Transmission Time Intervals (TTI) in a scheduled transmission of a plurality of TTI; and
determining at least one reference signal locations based on the location of TTI transmissions, wherein the at least one reference signal locations are further determined from the location of TTI transmissions and at least one of a parameter from the list, a subframe index, a time interval between two TTIs of the scheduled transmission, a subband size, or a Time Division Duplex (TDD) configuration for the scheduled transmission.

17. The apparatus of claim 16, wherein the at least one reference signal locations are determined to be in predetermined TTI instances of the plurality of TTI and a number of predetermined TTI instances is less than the number of the plurality of TTI, wherein the reference signal is present only in the predetermined TTI instances.

18. The apparatus of claim 16, wherein in response to one TTI in the scheduled transmission, the at least one reference signal locations are determined to be in a first predetermined TTI instance of the plurality of TTI, in response to three consecutive TTI in the scheduled transmission, the at least one reference signal locations are determined to be in the first predetermined TTI instance and a third predetermined TTI instance of the plurality of TTI, and in response to seven consecutive TTI in the scheduled transmission, the at least one reference signal locations are determined to be in the first predetermined TTI instance, the third predetermined TTI instance, and a seventh predetermined TTI instance of the plurality of TTI.

19. The apparatus of claim 16, wherein the at least one reference signal locations are further determined to be in predetermined subband instances of predetermined TTI instances.

* * * * *